(12) United States Patent
Giammaria

(10) Patent No.: US 6,588,011 B1
(45) Date of Patent: Jul. 1, 2003

(54) APPARATUS FOR AUTOMATICALLY GENERATING RESTORE PROCESS DURING SOFTWARE DEPOLYMENT AND METHOD THEREFOR

(75) Inventor: Alberto Giammaria, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/460,851

(22) Filed: Dec. 14, 1999

(51) Int. Cl.[7] .................................................. G06F 9/45
(52) U.S. Cl. ........................ 717/174; 717/170; 707/511
(58) Field of Search ................................ 717/174, 175, 717/101, 120, 168, 170, 108, 171, 172, 176, 177; 707/203, 511; 709/203

(56) References Cited

U.S. PATENT DOCUMENTS

| | | | |
|---|---|---|---|
| 4,523,206 A | 6/1985 | Sasscer ........................ 364/200 |
| 4,697,266 A | 9/1987 | Finley .......................... 371/12 |
| 5,367,643 A | 11/1994 | Chang et al. ................ 395/325 |
| 5,446,874 A | 8/1995 | Waclawsky et al. ......... 395/575 |
| 5,448,230 A | 9/1995 | Schanker et al. ....... 340/870.03 |
| 5,455,934 A | 10/1995 | Holland et al. .............. 395/404 |
| 5,457,683 A | 10/1995 | Robins ......................... 370/60 |
| 5,566,306 A | 10/1996 | Ishida ......................... 395/309 |
| 5,572,678 A | 11/1996 | Homma et al. ......... 395/200.12 |
| 5,586,256 A | 12/1996 | Thiel et al. ............ 395/200.03 |
| 5,590,124 A | 12/1996 | Robins ......................... 370/258 |
| 5,680,602 A | 10/1997 | Bloem et al. ................ 395/601 |
| 5,701,482 A | 12/1997 | Harrison et al. ............. 395/675 |
| 5,724,516 A | 3/1998 | Temoshenko ........... 395/200.32 |
| 5,745,783 A | 4/1998 | Suzuki et al. ............... 395/825 |
| 5,754,763 A | 5/1998 | Bereiter .................. 395/187.01 |
| 5,799,323 A | 8/1998 | Mosher, Jr. et al. ........ 707/202 |
| 5,805,920 A | 9/1998 | Sprenkle et al. ............. 395/821 |
| 5,819,083 A | 10/1998 | Chen et al. .................. 395/610 |
| 5,842,212 A | 11/1998 | Ballurio et al. .............. 707/100 |
| 5,903,897 A | * 5/1999 | Carrier, III et al. .......... 707/203 |
| 6,059,838 A | * 5/2000 | Fraley et al. ................ 717/108 |
| 6,125,442 A | * 9/2000 | Maves et al. ................ 712/220 |

(List continued on next page.)

FOREIGN PATENT DOCUMENTS

| | | |
|---|---|---|
| EP | 0 192 120 | 8/1986 |
| EP | 0 711 088 | 5/1996 |
| EP | 0 871 123 | 10/1998 |
| IE | 940318 | 4/1994 |
| WO | WO 97/15018 | 4/1997 |
| WO | WO97/38624 | 10/1997 |

OTHER PUBLICATIONS

Hall et al., "A cooperative approach to support software depolyment using software dock", ACM ICSE, pp 174–183, 1999.*

Hoek, "Configurable software architecture in support of configuration management and software deployment", ACM ICSE, pp 732–733, 1999.*

Andersson, A deployment system for pervasive computing, IEEE, pp 262–270, 2000.*

Estublier et al, "Foundations of enterprise software depolyment", IEEE SW Maint. and ReEng. pp 75–63, 2000.*

(List continued on next page.)

Primary Examiner—Anil Khatri

(57) ABSTRACT

A mechanism for automatically generating the software program for returning a client system to its initial state following a software installation is implemented. The mechanism rests on an object-oriented architecture that provides a multiplicity of actions that effect software management operations on the target system. The actions are implemented as methods within the object-oriented architecture. In this way, each software element, for example registry entries files, directories, etc., which may be implicated in a software deployment, are treated on an equal footing. The mechanism builds a program which, when executed, restores the target client to its unmodified state.

21 Claims, 3 Drawing Sheets-

U.S. PATENT DOCUMENTS

| | | | | |
|---|---|---|---|---|
| 6,151,700 | A | * 11/2000 | Fox | 717/107 |
| 6,195,795 | B1 | * 2/2001 | Block et al. | 717/101 |
| 6,202,207 | B1 | * 3/2001 | Donohue | 717/173 |
| 6,223,343 | B1 | * 4/2001 | Hopwood et al. | 717/101 |
| 6,263,492 | B1 | * 7/2001 | Fraley et al. | 717/107 |
| 6,269,476 | B1 | * 7/2001 | Nanba et al. | 717/108 |
| 6,298,476 | B1 | * 10/2001 | Misheski et al. | 717/101 |
| 6,324,578 | B1 | * 11/2001 | Cox et al. | 709/223 |
| 6,347,397 | B1 | * 2/2002 | Curtis | 717/170 |
| 6,385,766 | B1 | * 5/2002 | Doran, Jr. et al. | 717/174 |
| 6,477,572 | B1 | * 11/2002 | Elderton et al. | 709/224 |
| 6,490,723 | B1 | * 12/2002 | Bearden et al. | 717/174 |

OTHER PUBLICATIONS

"Error Handler Activation Procedure," *IBM Technical Disclosure Bulletin*, vol. 37 No. 08, Aug. 1994, pp. 231–232.

"Transferring Bulk Data in Message Queueing System," *IBM Technical Disclosure Bulletin*, vol. 41 No. 01, Jan. 1998, pp. 437–438.

"Execution Time Dynamic Data Collection at First Detection of Failure," *IBM Technical Disclosure Bulletin*, vol. 37 No. 06B, Jun. 1994, pp. 391–392.

"Variable Paged Array' Datatype," *IBM Technical Disclosure Bulletin*, vol. 37 No. 07, Jul. 1994, pp. 89–92.

"Distributing a Document Using a Regional Reference," *IBM Technical Disclosure Bulletin*, vol. 33 No. 3A, Aug. 1990, p. 251.

"Using Data Link Control–Level Feedback to Control Application Buffer Usage and Packet Loss," *IBM Technical Disclosure Bulletin*, vol. 41 No. 01, Jan. 1998, pp. 199–204.

"Dynamic Determination of Network Topology," *IBM Technical Disclosure Bulletin*, vol. 38 No. 03, Mar. 1995, pp. 411–418.

"Pointer Collection and Reporting for Error Recovery Procedures Branching," *IBM Technical Disclosure Bulletin*, vol. 39 No. 07, Jul. 1996, pp. 87–90.

"Hybrid Switch Control Scheme for Fast Point–to–Point/Multicast/Hunt–Group Connection Setup," *IBM Technical Disclosure Bulletin*, vol. 37 No. 11, Nov. 1994, pp. 641–646.

"Flow Control of Prioritized Data in a Multimedia Communications System," *IBM Technical Disclosure Bulletin*, vol. 37 No. 01, Jan. 1994, pp. 531–532.

"Distributed Object Encapsulation of Customer Information Control System Distributed Transaction Processing," *IBM Technical Disclosure Bulletin*, vol. 38 No. 01, Jan. 1995, pp. 179–180.

"Reconciliation of Shadowed Mail Items with Master," *IBM Technical Disclosure Bulletin*, vol. 33 No. 6B, Nov. 1990, pp. 120–121.

"Riadata—An Automated Retain Incident Analysis Facility," *IBM Technical Disclosure Bulletin*, vol. 34 No. 10A, Mar. 1992, pp. 278–283.

Cao G. et al., "Low–cost Checkpointing with Mutable Checkpoints in Mobile Computing Systems," International Conference on Distributed Computing Systems, 18th, Amsterdam, May 26–29, 1998, Proceedings, pp. 464–471.

Wiener, J.L. et al., "OODE Bulk Loading Revisited: the Partitioned–list Approach," International Conference on Very Large Data Bases, 21st, Zurich, Sep. 11–15, 1995, Proceedings of VLDB '95, pp. 30–41.

Muntz, D.A. et al., "Evaluating Delayed Write in a Multi-level Caching File System," IFIP/IEEE International Conference on Distributed Platforms, [Dresden, Feb. 27–Mar. 1, 1996], Proceedings: Client/Server and Beyond, pp. 415–429.

Jakoby, A. et al., "Data Transmission in Processor Networks," International Workshop on Distributed Algorithms, 9th, Proceedings of WDAG '95, pp. 145–159.

Joshi, A. et al., "On Disconnected Browsing of Distributed Information," International Workshop on Research Issues in Data Engineering, 7th, Birmingham, UK, Apr. 7–8, 1997, Proceedings: High Performance Database Management for Large–scale Applications, pp. 101–107.

Saglietti, F., "Dynamic Decision on Checkpointing by Use of Reduced Ordered Binary Decision Diagrams," International Conference on Computer Safety, Reliability and Security, 16th, York, UK, Sep. 7–10, 1997, [Proceedings of] SAFECOMP '97.

* cited by examiner

APPARATUS FOR AUTOMATICALLY GENERATING RESTORE PROCESS DURING SOFTWARE DEPOLYMENT AND METHOD THEREFOR

CROSS REFERENCE TO RELATED APPLICATIONS

Related subject matter may be found in the following commonly assigned, co-pending U.S. Patent Applications, which are hereby incorporated by reference herein:

Ser. No. 09/460,855, entitled "APPARATUS FOR DATA DEPOTING AND METHOD THEREFOR";

Ser. No. 09/460,853, entitled "APPARATUS FOR RELIABLY RESTARTING INTERRUPTED DATA TRANSFER AT LAST SUCCESSFUL TRANSFER POINT AND METHOD THEREFOR";

Ser. No. 09/438,436, entitled "APPARATUS FOR CONNECTION MANAGEMENT AND METHOD THEREFOR" and;

Ser. No. 09/458,268, entitled "COMPUTER NETWORK CONTROL SYSTEMS AND METHODS";

Ser. No. 09/460,852, entitled "METHODS OF DISTRIBUTING DATA IN A COMPUTER NETWORK AND SYSTEMS USING THE SAME";

Ser. No. 09/458,269, entitled "SYSTEMS AND METHODS FOR REAL TIME PROGRESS MONITORING IN A COMPUTER NETWORK";

Ser. No. 09/460,854, entitled "AN APPARATUS FOR JOURNALING DURING SOFTWARE DEPLOYMENT AND METHOD THEREFOR".

TECHNICAL FIELD

The present invention relates in general to data processing systems, and in particular, to server systems deploying software to client data processing systems.

BACKGROUND INFORMATION

Typical data processing methodologies for installing, updating and maintaining software on client systems are based on a simple "copy files and execute scripts" model. In other words, files to be deployed are copied from a server storage area, in accordance with a script, and downloaded to the target client, also in accordance with the script. A script is a sequence of instructions that is interpreted by the scripting language program. Generally, scripts take longer to run than a compiled program, and are typically better suited for programs of limited capability, or that can reuse and tie together existing compiled programs.

With increasing sophistication of data processing systems, generally, and in the operating systems associated therewith, the process of installing or updating software, that is, software deployment, has become much more complex. In addition to merely typing lines of text, installation software must be able to handle registry entries, INI file entries, folders, and shortcuts, for example. The registry, within the Windows™ Operating System context, for example, is an operating system database that contains information about the operating system, its applications, and file associations. The registry holds both hardware and software information. The installation software must be able to modify information within the registry data base. Similarly, INI files hold configuration information for applications installed on the data processing system. Installation software must also be able to modify entries in INI files. Shortcuts or icons presented on the desktop that may be used to provide quick access to the associated application. Installation software must be able to install shortcut information associated with a particular application that is being installed so that the operating system can link the shortcut and the application, as well as display the shortcut on the desktop.

The aforementioned scripting methodologies are complicated to use with a complex configuration process demanded by modern data processing software. For example, the Microsoft® Office 95 installation program adds, in order of magnitude, a thousand registry entries arid several tens of shortcuts. When such large numbers of entries are involved, the scripting methodologies are prone to error, complicating the task of generating the installation software. Additionally, software deployment typically requires that multiple actions be taken on the target machine. Often, an install operation is also accompanied by the need to remove files and entries, as well as the installation of the software elements. This adds to the complexity of the process for generating the required scripts.

Thus, there is need in the art for mechanisms to manage the deployment of software. In particular, there is a need for methods and apparatus for automatically generating software useable for restoring a target system to its original state following a software installation procedure, and additionally, there is a need for apparatus and methods to automatically generate the restoration software during the deployment process.

SUMMARY OF THE INVENTION

The aforementioned needs are addressed by the present invention. Accordingly, there is provided, in a first form, a software deployment method. The method includes executing one or more actions modifying at least one software elements on a client processing system. A program is built for returning the client system to an unmodified state. Building the program includes determining a type of the one or more actions and inserting a call to a corresponding complementary method in a program file containing the program.

There is also provided, in a second form, a computer program product adapted for storage on machine readable media, the program product including programming for software deployment. The programming contains programming for executing one or more actions modifying at least one software elements on a client processing system programming for building a program for returning the client system to an unmodified state. The programming for building a program determines a type of the one or more actions and inserts a call to a corresponding complementary method in a program file containing the program.

Additionally, there is provided, in a third form, a data processing system for software deployment. The system contained circuitry operable for executing one or more actions modifying at least one software elements on a client processing system and circuitry operable for building a program for returning the client system to an unmodified state. The circuitry for returning the client system to an unmodified state includes circuitry operable for building a program in which the circuitry is operable for determining a type of the one or more actions. There is also circuitry operable for inserting a call to a corresponding complementary method in a program file containing the program.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
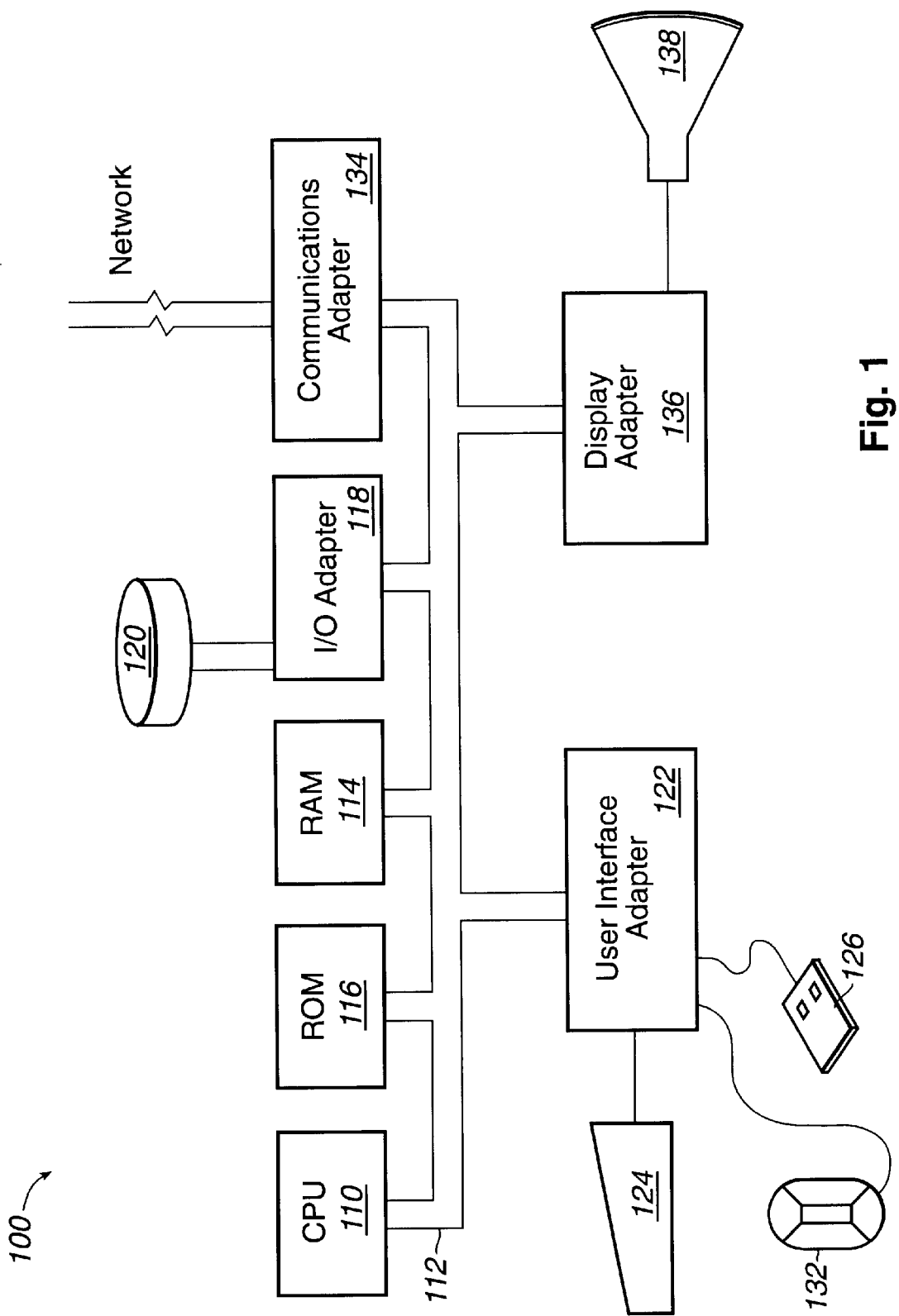
FIG. 1 illustrates, in block diagram form, a data processing system in accordance with an embodiment of the present invention.

The present invention provides a mechanism for automatically generating the software program for returning a client system to its initial state following a software installation. The mechanism rests on an object-oriented architecture that provides a multiplicity of actions that effect software management operations on the target system. The actions are implemented as methods within the object-oriented architecture. In this way, each software element, for example registry entries files, directories, etc., which may be implicated in a software deployment, are treated on an equal footing. The mechanism builds a program which, when executed, restores the target client to its unmodified state.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring first to FIG. 1, an example is shown of a data processing system 100 which may be used for the invention. The system has a central processing unit (CPU) 110, which is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system blus 112. I/O adapter 118 may be a small computer system interface ("SCSI") adapter that communicates with a disk storage device 120. Communications adapter 134 interconnects bus 112 with an outside network enabling the communicate with other such systems. Input/Output devices are also connected to system bus 112 via user interface adapter 122 and display adapter 136. Keyboard 124, track ball 132, mouse 126 are all interconnected to bus 112 via user interface adapter 122. Display monitor 138 is connected to system bus 112 by display adapter 136. Additionally, an operating system coordinates operation of the components of system 100.

Preferred implementations of the invention include implementations as a computer system programmed to execute the method or methods described herein, and as a computer program product. According to the computer system implementation, sets of instructions for executing the method or methods are resident in the random access memory 114 of one or more computer systems configured generally as described above. Until required by the computer system, the set of instructions may be stored as a computer program product in another computer memory, for example, in disk drive 120 (which may include a removable memory such as an optical disk or floppy disk for eventual use in the disk drive 120). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements. Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Figure 2:
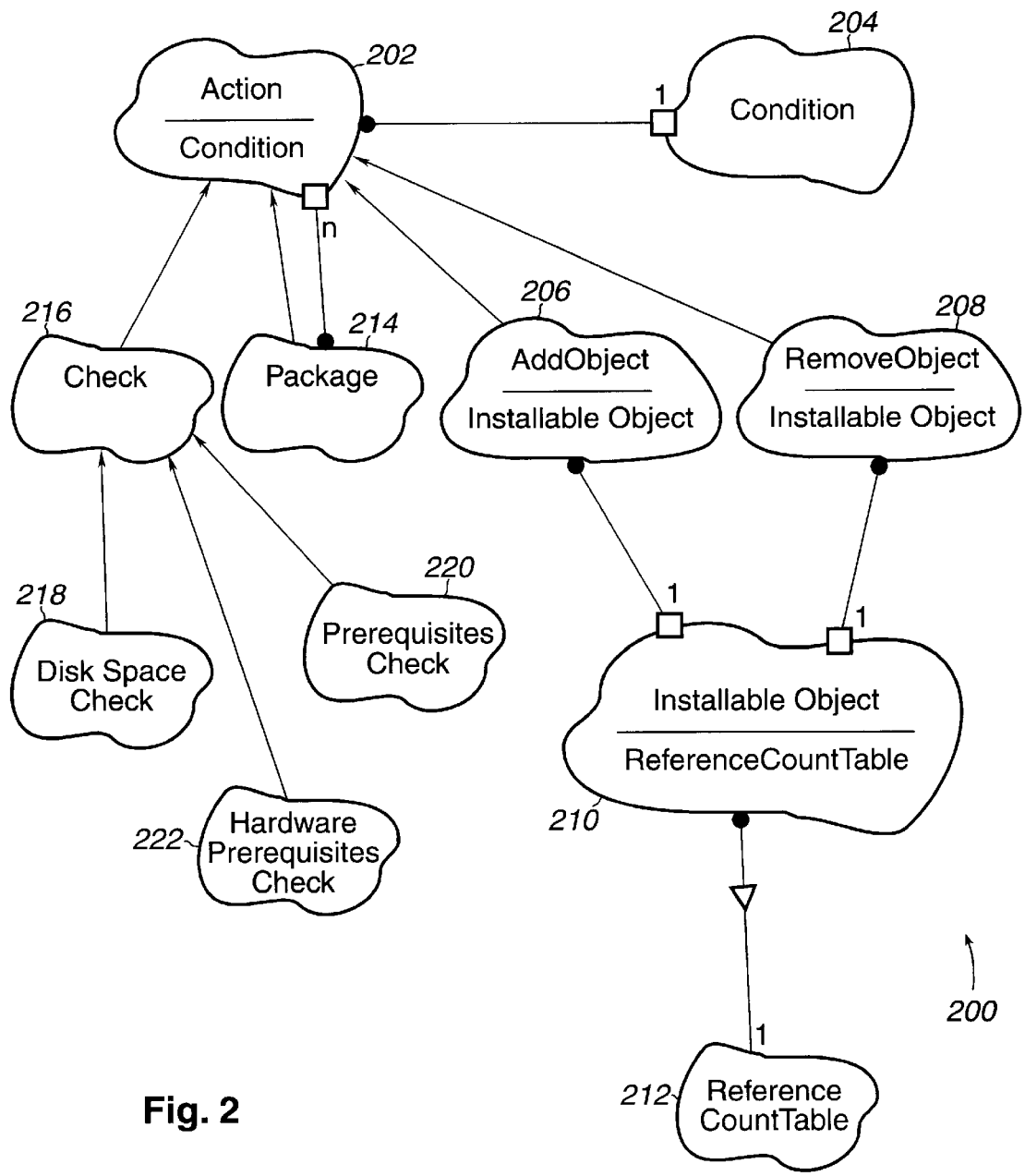
FIG. 2 schematically illustrates an object-oriented software architecture which may be used with the present invention.

FIG. 2 illustrates a high level diagram of an object-oriented software architecture which may be used with the present invention. (In FIG. 2, derived classes are indicated by an arrow directed to the classes from which they inherit, and aggregation, or composition, is shown using line segments having a filled circle denoting the container object and an open square denoting the contained object(s).) The common behavior of any action allowed in the deployment of a software package are defined by the Action Class 202. Action Class 202 is an abstract base class. The interface of the Action Class 202 consists of a set of methods. These are summarized in Table 1:

TABLE 1

| Method | Effect |
|---|---|
| execute | Executes the action |
| reverse | Executes the opposite of the execute operation |
| undo | Returns the system prior to the execution of the last operation |
| accept | Relinquishes all the resources needed to provide undo-ability of the last operation |
| commit | Commits all updates of the last operation |
| verify | Verifies the successful execution of the last operation |
| check_execute | Verifies that it is possible to perform the execute operation |
| check_reverse | Verifies that it is possible to perform the reverse operation |

TABLE 1-continued

| Method | Effect |
|---|---|
| check_undo | Verifies that it is possible to perform undo operation |
| check_commit | Verifies that it is possible to perform the commit operation |
| backup | Backup any resource that will be modified to enable returning target to original state |

Although all of the methods may be used during the deployment of a particular software package, in building a program to return a client to an unmodified state, not all methods may be needed. The methods of the Action class 202 that are pertinent to the present invention will be discussed further in conjunction with FIG. 3.

Each of the methods of the Action Class 202 return values which may determine a specific behavior of the operation flow control on the deployment package. These are summarized in Table 2:

TABLE 2

| Return Value of Action or Check | Flow Control Effect |
|---|---|
| success | Continue to next action in the package. |
| success, reboot now | Reboot immediately and continue to next action in the package. |
| success, reboot now and execute again | Reboot immediately and execute the operation again on this action. |
| success, reboot after | Continue to next action in the package and reboot after all action in the package have been executed. |
| success, reboot after and execute again | Continue to next action, reboot after all actions in the package have been executed and execute the operation again on this action. |
| warning | Continue to next action if stop_on_warning = false, stop execution if stop_on_warning = true. |
| temporary_failure | The operation cannot proceed because of temporary errors that can disappear executing the operation in transactional mode. Continue to next action if stop_on_error = false, stop execution if stop_on_error = true. |
| permanent_failure | The operation cannot proceed because of permanent errors. Continue to next action if stop_on_error = false, stop execution if stop_on_error true. |
| fatal_failure | Stop execution. |

Return values which affect the flow of the methodology of the present invention, will be described below in conjunction with FIG. 3.

Each action instance can have an associated condition that defines whether operations on that action should be skipped. The abstract Condition Class 204 defines the common behaviors of any conditions which may be allowed. Condition Class 204 exists for convenience in defining classes which inherit from the abstract Action Class 202. Conditions are useful, for example, when in the same deployment package there are actions specific to target operating systems and it is desired that the specific actions be executed only on the corresponding target systems. Thus, for example, if in the same software deployment package there are Windows™ 95 and UNIX® actions, and it is desired that Windows™ 95 actions be executed only on Windows™ 95 targets, and UNIX® actions be executed only on UNIX® targets.

The concrete AddObject class 206 and the concrete RemoveObject class 208 respectively represent an action that adds an object to a target, and an action that removes an object from a target. Each of these concrete classes is a derived class of the abstract action class 202. The AddObject class 206 and RemoveObject class 208 each, include, as a member, the InstallableObject class 210. The InstallableObject class 210 is an abstract class that represents an object that can be added, replaced or removed from a target. Subclasses, or, equivalently, derived classes of the InstallableObject class 210, may include, for example, text file objects, file system objects, Windows™ registry objects, and Windows™ INI file objects.

The AddObject class 206 and RemoveObject class 208 implement all of their respective action operations on top of the InstallableObject interface. The correspondence, or mapping, of the methods of the AddObject class 206 and the RemoveObject class 208 are shown in Tables 3 and 4, respectively:

TABLE 3

| AddObject method | InstallableObject method |
|---|---|
| execute | add |
| reverse | remove |
| verify | is_identical |
| check_execute | check_add |
| check_reverse | check_remove |

TABLE 4

| RemoveObject method | InstallableObject method |
|---|---|
| execute | remove |
| reverse | no action |
| verify | not exit |
| check_execute | check_remove |
| check_reverse | no action |

Note that, the methods of the AddObject class 206 and RemoveObject class 208 include methods inherited from the base Action Class 202.

The interface of the InstallableObject class on top of which the AddObject class 206 and RemoveObject class 208 implement their respective methods are summarized in Table 5:

TABLE 5

| Name | Action Operation |
|---|---|
| add | Adds the object to the target. |
| remove | Removes the object from the target. |
| check_add | Verifies that is possible to perform the add operation. |
| check_remove | Verifies that it is possible to perform the remove operation. |
| exist | Indicates whether an object with the same name already exists on the target. |
| is_identical | Indicates whether an object with the same properties is already present on the target. |
| is_newer | Indicate whether an object with the same name but newer is already on the target. |

The InstallableObject class 210 includes, as a member, the Reference Count Table class 212. Instances of installable objects, which are derived from the InstallableObject class 210 as discussed above, may belong to more than one software package. The number of the reference count table class belonging to an instance of an installable object tracks the number of active packages that refer to that particular installable object. The reference count table associates names of installable objects with the number of active packages that use them. The interface of the Reference Count Table class 212 includes an add-reference method and remove-reference method which increment and decrement the reference count associated with an object name.

Packages are instances of the package class 214. Instances of the package class 214 represent the lowest level of software objects that can be operated on by the software administration utilities defined within architecture 200. A package is a container of actions as indicated in FIG. 2, showing that a package object may be composed of, or aggregate, n action class objects. A package represents the smallest object that may be installed, although an administrator may install a "bundle" of packages. An exemplary package will be discussed below in conjunction with FIG. 3. An instance of the package class 214 may include a plurality of members derived from the action class 202.

Additionally, there is provided the CheckClass 216. This provides an interface to perform additional checks other than those implemented for each single action, such as the check_execute, and check_reverse methods of the Action-Class 202, referred to in Table 1. For example, it may be desirable to determine if there is enough disk space for executing an operation on an entire package, or launching a dialogue to ask the user for authorization to proceed with a certain operation on a given package. Exemplary concrete subclasses of the CheckClass 216 include the DiskSpaceCbeck class 218, the PrerequisiteCheck class 220 and the HardwarePrerequisitecheck class 222.

Figure 3:
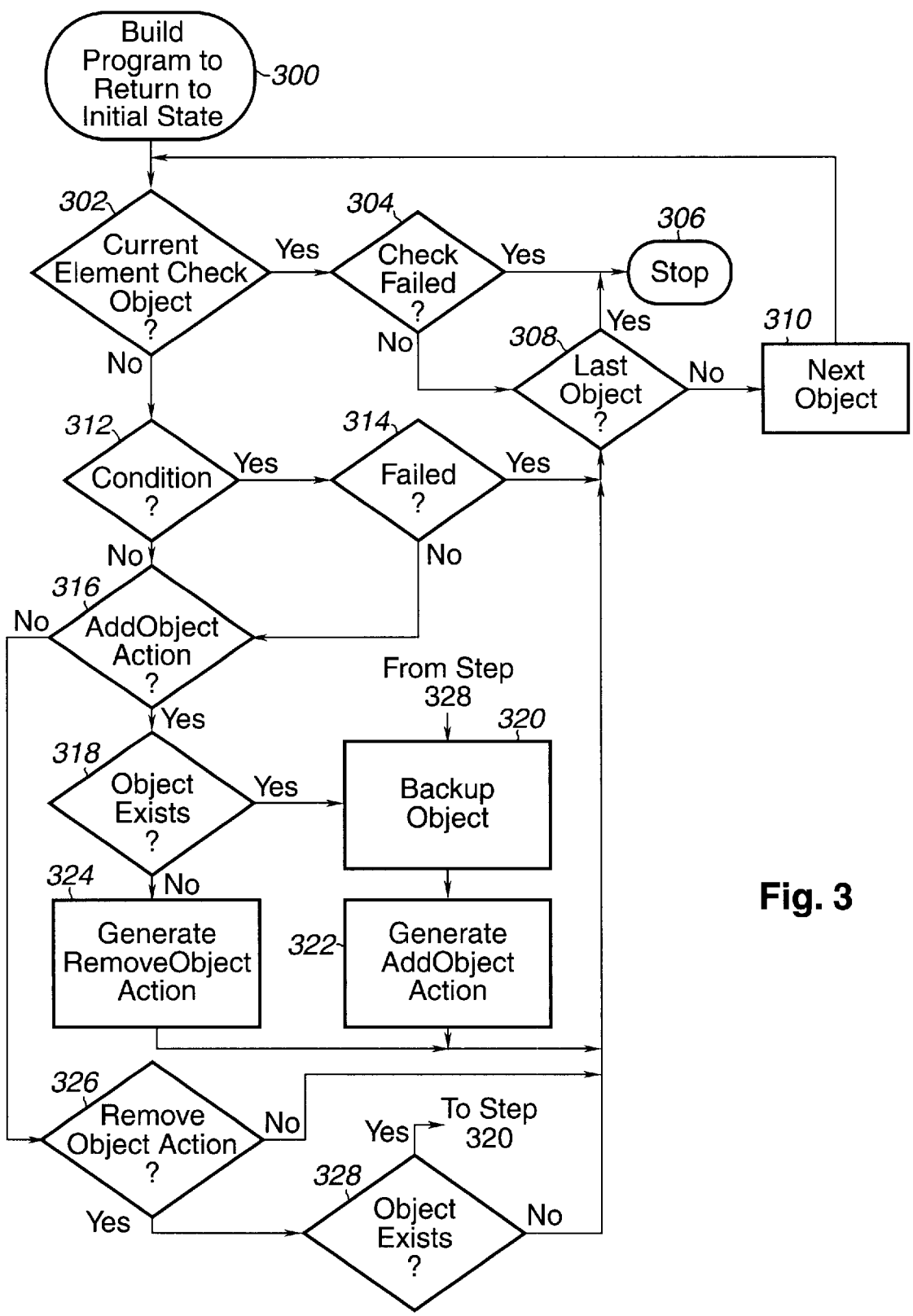
FIG. 3 illustrates, in flowchart form, a program generation methodology in accordance with an embodiment of the present invention.

Referring now to FIG. 3, there is illustrated a flowchart for a procedure 300 for building a program to return a target system to a preexisting initial state following a software deployment. Procedure 300 may build the software package using architecture 200 of FIG. 2.

In step 302, it is determined if a current object in the package is a Check object. If so, it is then determined, step 304, if the Check failed. In an embodiment of the present invention in accordance with the architecture in FIG. 2, a failure may be indicated by a return value of a method of Check Class 218, returning one of the return values corresponding to an unsuccessful result, as discussed above in conjunction with FIG. 2 and TABLE 2. If the Check has failed, then methodology 300 terminates in step 306. Otherwise, if the Check is successful, in step 308 it is determined of the current object is the last object in the package. If so, methodology 300 also terminates, step 306. Otherwise methodology 300 proceeds to the next object in the package, step 310.

If, in step 302 it is determined that the current object is not a check object, the current object is an action, and in step 312 it is determined if the action contains a Condition. Recall that, Action Class 202, FIG. 2, is a container class for an object of the Condition Class 204. The interface of Condition Class 204 may include an evaluate method for evaluating the condition. If in deploying a package, the current action evaluates a condition, via the evaluate method, for example, the methodology 300, in step 312 will proceed by the "Yes" branch to step 314. If the condition fails, which may be indicated, in an embodiment of the present invention in accordance with the architecture of FIG. 2, by one of the unsuccessful return values, then methodology 300 returns to step 308, discussed above. Otherwise, is step 314, the condition is successful, and methodology 300 proceeds to step 316. Step 316 may also be reached from step 312 if the current action does not contain a condition object.

In step 316 it is determined if the current action is an AddObject action. In an embodiment of the present invention implemented in accordance with the architecture described in conjunction with FIG. 2, an AddObject action may be executed via the execute method of the interface of the AddObject Class 206. Assuming first that the current action is an AddObject action, it is then determined, step 318 if the object exists on the target system. If so, the object is backed up, step 320. The object may be backed up by invoking the backup method in the interface of the interface of Action Class 202, FIG. 2. Then, in step 322, an AddObject action is generated for the object backed up in step 320, and written to the program being built for returning the target system to an initial state. The AddObject action may be implemented through the execute method of the AddObject Class 206 interface. Methodology 300 then returns to step 308, discussed above, to proceed to the next action in the package, if any. If however, in step 318, the object does not exist, in step 324, a RemoveObject action is generated for the object added by the current AddObject action in the package being deployed, and added to the program being built. Recall that in adding and removing objects from a target system in accordance with the architecture of FIG. 2, the AddObject and RemoveObject actions may be implemented using the execute method of the respective one of the AddObject Class 206 and RemoveObject Class 208 interface. In adding or removing an object, the corresponding reference count must be incremented or decremented, as described above. This may be performed by the corresponding execute method which may be implemented to invoke the corresponding one of the add$_{13}$ reference method and remove_reference method of the ReferenceCountTable Class 212 interface.

Returning to step 316, if the current action is not an AddObject action, it is determined if the current action is a RemoveObject action, step 326. If not, methodology 300 returns to step 308. If, however, in step 326, the action is a RemoveObject action, it is then determined, in step 328, if the object exists on the target system. If not, methodology 300 returns to step 308 to proceed to the next action if any. (In executing the RemoveObject action in the underlying package, the return value will indicate that the action fails because the object to be removed does not exist, and nothing need be written into the program to return the target system to an initial state.) If, however, the object does exist on the target system, it must be backed up, and in step 328, methodology 300 proceeds by the "Yes" branch to step 320 to back up the object, as previously described. A corresponding AddObject action to add the backed up object to the target system is generated and written to the program file in step 322.

Methodology 300 may be further understood by considering a concrete example, in pseudocode form, of a simple distribution package, for adding files to a target:

```
Package{
    DiskSpaceCheck{
        c:\prog_files ≧ 40 MB
    }
    condition{
        OS == WinNT
        addFile{
            source_name = c:\source_dir\WinNTprog_1
            target_name = c:\prog_files\WinNTprog_1
        }
    }
    condition{
        OS == Win95
        addFile{
            source_name = c:\source_dir\Win95prog_1
            target_name = c:\prog_files\Win95prog_1
        }
    }
}
```

Recall that a Package is a container for Action class objects, and the first action in the exemplary package is a CheckClass method, DiskSpaceCheck, discussed hereinabove in conjunction with CheckClass 216. If the result of the DiskSpaceCheck action is successful, that is there is sufficient space on the target for the file to be added, then the remaining actions in the Package are executed. Otherwise the execution of the distribution package terminates. The Package also includes two AddFile actions may be implemented, in accordance with the architecture of FIG. 2 by invoking, for the corresponding file objects, the execute method of the AddObject Class 206 interface as previously described in conjunction with FIG. 2. Execution of the AddFile actions are conditioned on the operating system of the target. If the target operating system is WindowsNT™, the first condition above is satisfied, and the corresponding AddFile action will be taken to add the file WinNTprog_1 to the target system. Alternatively, if the target operating system is Windows95™, the second AddFile action will be taken to add the file WinNTprog_1 of the target system. If however, the target operating system is neither WindowsNT™ nor Windows95™, the Package takes no action. Thus, in methodology 300, if the operating system of the target is WindowsNT™, the first condition above will return successfully in step 312, but not the second. Then, in step 318, a file, WinNTprog_1, exists on the target, it will be backed up in step 320, and an AddObject action directed to the backup will be generated in step 322. Otherwise, in step 324 of methodology 300, a RemoveObject action directed to the file with target system path c:\prog_files\WinNTprog_1 will be generated and inserted in the program being built. Conversely, if the target operating system is Windows95™ the corresponding operations will be performed with respect to the file object Win95prog_1.

In this way, a mechanism for restoring a client target to its initial state prio the execution of a software deployment package is provided. A software program is built by storing in a program file, available for subsequent compilation and execution, a set of program statements that are complimentary to the actions being taken by the underlying deployment package. Additionally, backup copies of preexisting software objects are saved for subsequent restoration of the client target.

Although the present invention and its advantages have been described in detail, it should be understood that various changes, substitutions and alterations can be made herein without departing from the spirit and scope of the invention as defined by the appended claims.

What is claimed is:

1. A software deployment method comprising the steps of:
  executing one or more actions modifying at least one software element on a client processing system; and
  building a program for returning said client system to an unmodified state, said step of building a program comprising the substeps of:
    determining a type of said one or more actions; and
    inserting a call to a corresponding complementary method in a program file containing said program if an object of said action does not exist on said client system.

2. The method of claim 1 wherein said substeps of determining a type of action and inserting a corresponding complementary method are repeated for each action of said one or more actions.

3. The method of claim 1 wherein said type of said of said one or more actions is selected from the group consisting of add object actions and remove object actions and wherein, for an add object action, said step of inserting a call comprises the step of inserting a call statement for a method for removing a corresponding object if said object did not exist on said client system and, for a remove object action, said step of inserting a call comprises the step of inserting a call statement for a method for adding a corresponding object.

4. The method of claim 1 wherein said step of building a program further comprises the step of, for an add object action, determining if an object to be added exists on said client system.

5. The method of claim 4 wherein said step of building a program further comprises the steps of, if said object to be added exists on said client system:
  saving a copy of said existing object; and
  inserting in said program file a call statement for a method for adding said copy to said client system.

6. The method of claim 5 where said steps of determining if an object to be added exists on said client system, saving a copy of said existing object and inserting a program call are repeated for each add object action of said one or more actions.

7. The method of claim 1 wherein said step of building a program further comprises, for a remove object action, the steps of:
  saving a copy of an object to be removed; and
  inserting in said program file a call statement for a method for adding said copy to said client system.

8. A computer program product adapted for storage on machine readable media, the program product including programming for software deployment comprising instructions for:
  executing one or more actions modifying at least one software element on a client processing system; and
  building a program for returning said client system to an unmodified state, said programming for building a program comprising:
    determining a type of said one or more actions; and
    inserting a call to a corresponding complementary method in a program file containing said program, if an object of said action does not exist on said client system.

9. The program product of claim 8 wherein said instructions for determining a type of action and inserting a corresponding complementary method further includes instructions for repeating, for each action of said one or more actions, determining a type of action and inserting said corresponding complementary method.

10. The program product of claim 8 wherein said type of said of said one or more actions is selected from the group consisting of add object actions and remove object actions and wherein, for an add object action, said step of inserting a call comprises the step of inserting a call statement for a method for removing a corresponding object if said object did not exist on said client system and, for a remove object action, said step of inserting a call comprises the step of inserting a call statement for a method for adding a corresponding object.

11. The program product of claim 8 wherein said programming for building a program further comprises instructions for, for an add object action, determining if an object to be added exists on said client system.

12. The program product of claim 11 wherein said programming for building a program further comprises instructions for, if said object to be added exists on said client system:
  saving a copy of said existing object; and inserting in said program file a call statement for a method for adding said copy to said client system.

13. The program product of claim 12 wherein said program product further includes instructions for repeating said instructions for determining if an object to be added exists on said client system, saving a copy of said existing object and inserting a program call for each add object action of said one or more actions.

14. The program product of claim 8 wherein said programming for building a program further comprises instructions for, for a remove object action:

programming for saving a copy of an object to be removed; and programming for inserting in said program file a call statement for a method for adding said copy to said client system.

15. A data processing system for software deployment comprising:

circuitry operable for executing one or more actions modifying at least one software element on a client processing system; and circuitry operable for building a program for returning said clients system to an unmodified state, said circuitry operable for building a program comprising:

circuitry operable for determining a type of said one or more actions; and circuitry operable for inserting a call to occur a corresponding complementary method in a program file containing said program if an object of said action does not exist on client system.

16. The data processing system of claim 15 wherein said circuitry operable for determining a type of action and inserting a corresponding complementary method further includes circuitry operable for repeating, for each action of said one or more actions, determining a type of action and inserting said corresponding complementary method.

17. The data processing system of claim 15 wherein said type of said of said one or more actions is selected from the group consisting of add object actions and remove object actions and wherein, for an add object action, said step of inserting a call comprises the step of inserting a call statement for a method for removing a corresponding object and, for a remove object action, said step of inserting a call comprises the step of inserting a call statement for a method for adding a corresponding object.

18. The data processing system of claim 15 wherein said circuitry operable for building a program further comprises circuitry operable for, for an add object action, determining if an object to be added exists on said client system.

19. The data processing system of claim 18 wherein said circuitry operable for building a program further comprises circuitry operable for, if said object to be added exists on said client system:

circuitry operable saving a copy of said existing object; and circuitry operable for inserting in said program file a call statement for a method for adding said copy to said client system.

20. The data processing system of claim 19 further comprising circuitry operable for repeating, for an add object action, determining if said object to be added exists on said client system, saving a copy of said existing object and inserting in said program file a call statement for a method for adding said copy, for each action of said one or more actions.

21. The data processing system of claim 19 wherein said circuitry operable for building a program further comprises circuitry operable for, for a remove object action:

circuitry operable for saving a copy of an object to be removed; and circuitry operable for inserting in said program file a call statement for a method for adding said copy to said client system.

* * * * *

UNITED STATES PATENT AND TRADEMARK OFFICE
CERTIFICATE OF CORRECTION

PATENT NO. : 6,588,011 B1  Page 1 of 1
DATED : July 1, 2003
INVENTOR(S) : Alberto Giammaria It is certified that error appears in the above-identified patent and that said Letters Patent is hereby corrected as shown below:

Title page,
Insert Item -- [74] *Attorney, Agent, or Firm*—Barry S. Newberger; Winstead Sechrest & Minick P.C.; Leslie A. Van Leeuwen --.

Column 9,
Line 63, following "type" please delete "of said".

Column 10,
Lines 47-48, following "type" please delete "of said".

Column 11,
Line 21, please replace "clients" with -- client --.
Line 25, please delete "occur".
Line 28, following "on" please insert -- said --.
Line 36, following "type" please delete "of said".

Column 12,
Line 16, following "operable" please insert -- for --.

Signed and Sealed this

Twentieth Day of January, 2004

JON W. DUDAS
*Acting Director of the United States Patent and Trademark Office*